(12) United States Patent
Haimovitch-Yogev et al.

(10) Patent No.: US 12,093,835 B2
(45) Date of Patent: *Sep. 17, 2024

(54) GEOMETRICALLY CONSTRAINED, UNSUPERVISED TRAINING OF CONVOLUTIONAL AUTOENCODERS FOR EXTRACTION OF EYE LANDMARKS

(71) Applicant: BLINK TECHNOLOGIES INC., Palo Alto, CA (US)

(72) Inventors: Oren Haimovitch-Yogev, Los Altos, CA (US); Tsahi Mizrahi, Yoqneam Ilit (IL); Andrey Zhitnikov, Haifa (IL); Almog David, Kiryat Motzkin (IL); Artyom Borzin, Haifa (IL); Gilad Drozdov, Haifa (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/971,601

(22) Filed: Oct. 23, 2022

(65) Prior Publication Data

US 2023/0334326 A1    Oct. 19, 2023

Related U.S. Application Data

(63) Continuation of application No. 16/732,640, filed on Jan. 2, 2020, now Pat. No. 11,514,720.
(Continued)

(51) Int. Cl.
*G06N 3/088* (2023.01)
*G06F 18/214* (2023.01)
(Continued)

(52) U.S. Cl.
CPC ......... *G06N 3/088* (2013.01); *G06F 18/2155* (2023.01); *G06N 3/04* (2013.01);
(Continued)

(58) Field of Classification Search
CPC . G06N 3/088; G06N 3/04; G06N 3/08; G06F 18/2155; G06T 7/11;
(Continued)

(56) References Cited

U.S. PATENT DOCUMENTS

2004/0022432 A1*  2/2004  Hayata ............... G06V 40/16
                                                      382/209
2017/0188823 A1*  7/2017  Ganesan ............. A61B 3/113
(Continued)

*Primary Examiner* — John W Lee
(74) *Attorney, Agent, or Firm* — AlphaPatent Associates Ltd.; Daniel J. Swirsky

(57) ABSTRACT

Unsupervised, deep learning of eye-landmarks in a user-specific eyes' image data by capturing an unlabeled image comprising an eye region of a user, using an initial geometrically regularized loss function, training a plurality of convolutional autoencoders on the unlabeled image comprising the eye region of the user to recover a plurality of user-specific eye landmarks, training a convolutional neural network for autoencoded landmarks-based recovery from the unlabeled image, and where the initial geometrically regularized loss function is represented by the formula $L_{AE} = \lambda_{recon}L_{recon} + \lambda_{conc}L_{conc} + \lambda_{sep}L_{sep} + \lambda_{eqv}L_{eqv}$ where $L_{AE}$ is total AutoEncoder Loss, $\lambda_{recon}L_{recon}$ is λ-weighted reconstruction loss, $\lambda_{conc}L_{conce}$ is λ-weighted concentration loss, $\lambda_{sep}L_{sep}$ is λ-weighted separation loss, and $\lambda_{eqv}L_{eqv}$ is λ-weighted equivalence loss.

16 Claims, 5 Drawing Sheets

Related U.S. Application Data

(60) Provisional application No. 62/787,404, filed on Jan. 2, 2019.

(51) Int. Cl.
| | |
|---|---|
| *G06N 3/04* | (2023.01) |
| *G06N 3/0455* | (2023.01) |
| *G06N 3/0464* | (2023.01) |
| *G06N 3/08* | (2023.01) |
| *G06N 20/10* | (2019.01) |
| *G06T 7/11* | (2017.01) |
| *G06V 10/75* | (2022.01) |
| *G06V 10/764* | (2022.01) |
| *G06V 10/82* | (2022.01) |
| *G06V 40/16* | (2022.01) |
| *G06V 40/18* | (2022.01) |
| *G06V 40/19* | (2022.01) |

(52) U.S. Cl.
CPC ............... *G06N 3/08* (2013.01); *G06T 7/11* (2017.01); *G06V 10/755* (2022.01); *G06V 10/82* (2022.01); *G06V 40/165* (2022.01); *G06V 40/171* (2022.01); *G06V 40/19* (2022.01); *G06V 40/193* (2022.01); *G06T 2207/20081* (2013.01); *G06T 2207/20084* (2013.01); *G06T 2207/20132* (2013.01)

(58) Field of Classification Search
CPC . G06T 2207/20081; G06T 2207/20084; G06T 2207/20132; G06V 10/755; G06V 10/82; G06V 40/165; G06V 40/171; G06V 40/19; G06V 40/193
See application file for complete search history.

(56) References Cited

U.S. PATENT DOCUMENTS

| | | | |
|---|---|---|---|
| 2019/0066281 A1* | 2/2019 | Zheng | G06N 3/047 |
| 2019/0147224 A1* | 5/2019 | Li | G06T 15/205 382/103 |
| 2019/0197670 A1* | 6/2019 | Ferrer | G06V 10/764 |
| 2020/0005060 A1* | 1/2020 | Martin | G06V 40/197 |

* cited by examiner

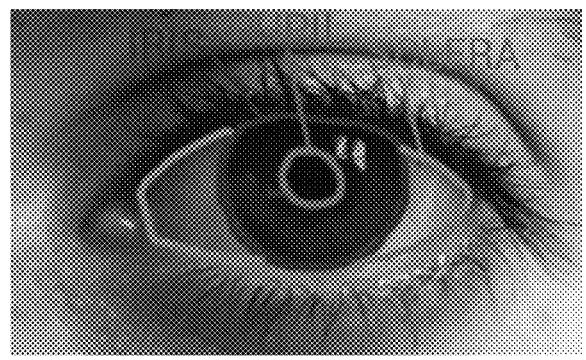
FIG. 9A
FIG. 9B
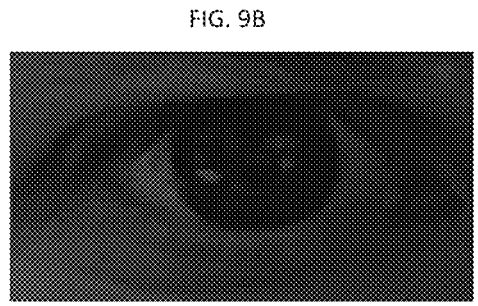
FIG. 9C
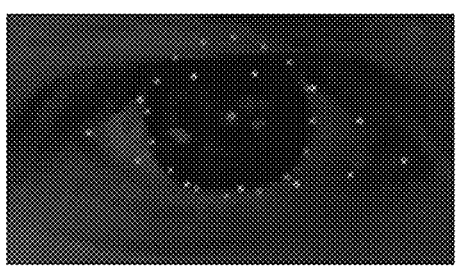
FIG. 9D
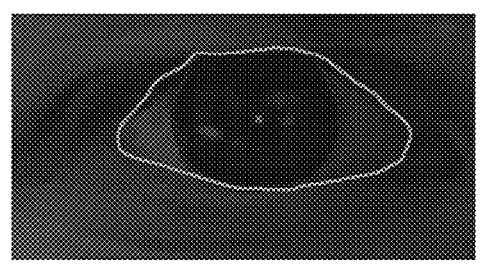

GEOMETRICALLY CONSTRAINED, UNSUPERVISED TRAINING OF CONVOLUTIONAL AUTOENCODERS FOR EXTRACTION OF EYE LANDMARKS

CROSS REFERENCE TO RELATED APPLICATIONS

This patent application is a continuation of U.S. patent application Ser. No. 16/732,640, filed Jan. 2, 2020, which claims priority from U.S. Provisional Patent Application No. 62/787,404, filed Jan. 2, 2019, the disclosure of which is incorporated herein by reference in its entirety.

COPYRIGHT NOTICE

A portion of the disclosure herein below contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND

The disclosure is directed to systems, methods and programs for gaze estimation. More specifically, the disclosure is directed to systems, methods and programs for geometrically constrained, unsupervised training of convolutional autoencoders on unlabeled images for extracting eye landmarks.

Estimation of a person's point-of-gaze (also referred to as point-of-regard) has become an important tool in a variety of applications, including, for example, the study of visual and oculomotor systems, the study of reading behavior, marketing/advertising research, and the control of device user interfaces (e.g., graphical user interfaces) using eye movements. Other uses can be assisting users with motor-disabilities or enable determining points of visual saliency using group analysis, without the cost of specialized hardware. Most eye gaze estimation systems rely on robust calibration requirements, which is inconvenient to the user, expensive, limits the amount of possible training data and consequently the performance of any application relying on the point of gaze estimation.

Existing gaze estimation systems can fail when encountering issues such as low image quality or challenging illumination conditions. Furthermore, accurate feature extraction, which could enable the gaze estimation, require specialized equipment such as IR radiation source stereoscopic devices and the like. In order to use cheaper equipment, such as smartphone cameras and the like, an extensive calibration is required, for example, lengthy process using clearly visually salient features during the process. Other processes include the use of large amounts of labeled data, which is hard and expensive to obtain.

Moreover, Model-based gaze estimation methods can not reveal full potential in unconstrained settings. This happens due to heavy reliance on estimated pupil location, glint identification or other geometric cues that are at best, would lead to a partially valid model.

These and other shortcomings of the existing technology are sought to be resolved herein.

SUMMARY

Disclosed, in various embodiments, examples, and implementations; are systems, methods and programs for geometrically constrained, unsupervised training of convolutional autoencoders on unlabeled images for extracting eye landmarks, the extracted eye landmarks used as training dataset for remote gaze estimation.

In an exemplary implementation provided herein is a method for unsupervised deep learning of gaze estimation in eyes' image data, implementable in a computerized system comprising: in imaging module, a user interface; an image database, a face detector module, an eye cropper module, and a central processing module in communication with the imaging module, the user interface, and the imaging database, the method comprising: capturing an unlabeled image comprising the eye region; and using an initial geometrically regularized loss function, training a plurality of convolutional autoencoders on the unlabeled image comprising the eye region to recover a plurality of eye landmarks.

In another exemplary implementation, provided herein is a processor readable media, comprising a set of executable instructions which, when executed cause the at least one processor being in communication with an imaging module, a central processing module, a database, a face detector module, and an eye cropper module to: capture an unlabeled image comprising the eye region; and using a geometrically regularized loss function, train a plurality of convolutional autoencoders on the unlabeled image comprising the eye region to recover a plurality of eye landmarks.

These and other features of the systems, methods and programs for using geometrically constrained, unsupervised training of convolutional autoencoders for extracting eye landmarks, will become apparent from the following detailed description when read in conjunction with the figures and examples, which are exemplary, not limiting.

BRIEF DESCRIPTION OF THE FIGURES

For a better understanding of systems, methods and programs for using geometrically constrained, unsupervised training of convolutional autoencoders for extracting eye landmarks, with regard to the implementations thereof, reference is made to the accompanying examples and figures, in which:

FIG. 9A, illustrates annotated eye image, with the original Eye image in FIG. 9B, the unsupervised extracted eye landmarks in FIG. 9C and the comparative (human) labeled landmarks in FIG. 9D.

DETAILED DESCRIPTION

Figure 1:
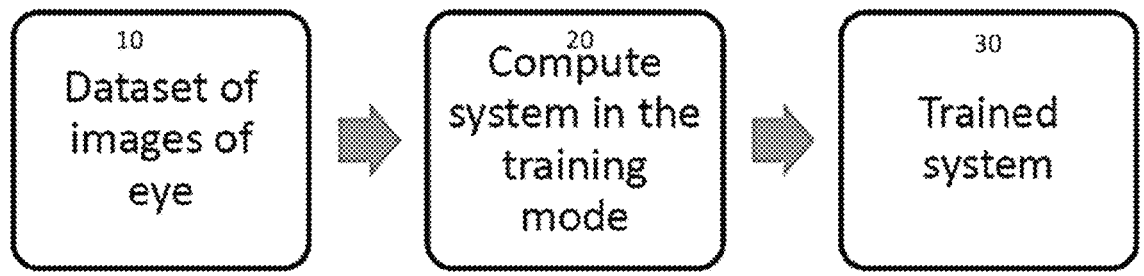
FIG. 1 illustrates a schematic of the general training flow.

Provided herein are embodiments, examples, uses and implementations of systems, methods and programs for geometrically and anatomically constrained, unsupervised training of convolutional autoencoders on unlabeled images for extracting eye landmarks.

In general, gaze estimation methods can be categorized as either model/feature-based or appearance-based. Model/Feature-based methods extract eye features such as eye contour, corners, pupil center and glint(s) (under active light sources, e.g., IR), and are capable of achieving relatively high accuracy. However, accurate and robust feature extraction requires specialized equipment such as infrared (IR) light source(s) or head mounted devices. Appearance-based approaches use the image itself as input and map it to point-of-regard. Both these approaches implicitly estimate the relevant gaze features, such as eye geometric features, intrinsic camera calibration parameters and personal variance. They are more versatile for general use as they do not require any special devices, and they can be interesting for multimedia domains, like quality assessment, visual saliency, advertising and gaming using gaze information. However, they are sensitive to noise caused by image quality and resolution, variance of lighting condition, head pose, and user variability.

While appearance-based models are typically considered to be better in unconstrained settings, user-independent application, and in circumstances where denoising is difficult or impractical, training of these systems can be very expensive, and the labeled data can vary greatly in the label provided, which can lead to misidentification. Furthermore, the computational resources needed to carry out the neural networks used can be substantial. Provided herein are systems, methods and programs for utilizing a hybrid method between appearance-based and model-based method, which use unlabeled image data that is geometrically and anatomically constrained in a geometrically regularized loss function to train convolutional autoencoders (and decoders) to extract features capable of being explicitly interpreted, used as input for a gaze estimation framework.

Given an unlabeled image of eye, or face, or head, the systems, methods and programs provided herein detects and extracts precise personalized landmarks capable of being interpreted, which allow, among other applications, applying model-based algorithms for accurate remote gaze (and field of view (FOV)) prediction for a given user. The unsupervised approach is regularized by geometric and anatomical constraints of the user, namely that regardless of the image angle, the iris geometry is preserved. Furthermore, the system can be trained easily and solely on images of eye(s) of the user without exhaustive labeling. The systems methods and programs provided allow precise eye landmarks to be found in an unsupervised manner, thus relaxing a demand for exhaustively large, consistently and thoroughly labeled dataset, which can be quite expensive and hard to validate. When fed into the appropriate model-based algorithm, these landmarks allow accurate remote gaze estimation.

Accordingly and in an exemplary implementation, provided herein is a method for unsupervised, or deep learning of gaze estimation in a given user's eyes' image data, implementable in a computerized system comprising: in imaging module, a face detection module, an eye region cropping module, a user interface; a given user image database, a face detector module, an eye cropper module, and a central processing module in communication with the imaging module, the user interface, and the imaging database, the method comprising: capturing an unlabeled image comprising the eye region of the given user; and using an initial geometrically regularized loss function, training a plurality of convolutional autoencoders on the unlabeled image comprising the eye region of the given user to recover a plurality of a user-specific eye landmarks.

As illustrated in FIG. 1, showing a schematic of the general system architecture. As shown, using the imaging module, the face detection module, and the eye region cropping module (see e.g., FIG. 3), unlabeled image dataset from the user can be captured 10, input into convolutional autoencoders' network for training 20, then the trained system 30, which can be used for later gaze estimation.

An example of a pseudo-code describing the process of preparing the dataset can be:
1. Obtain M images that include the given user's face, assign each image an ID based on the identification of the user in the image (M_ID).
2. For each image in set:
    a. detect face and eyes in the image (bounding box for eyes and face).
    b. filter out image(s) that do not have visible eyes in the frame:
        i. remove image(s) where a blink is detected.
        ii. remove image(s)s that do not have sufficient number of minimal pixel density (e.g., 2-pixels-per-millimeter).
    c. normalize all images to standard size (96×48)
    d. output clean dataset to be used for unsupervised training (M_TD_CLEAN)
3. generate two sets of valid landmarks constraints for each User ID:
    a. Iris Ellipsoid constrained to average size in population (e.g. 10-13 mm in diameter).
    b. Sclera Polynomial constraint (e.g. eyeball size is between 21-25 mm).

An example for the process as compared with supervised labeling is provided in FIG. 9, where FIG. 9A shows a human annotated procedure, where Sclera and Iris region are marked in the image plane. The offset between the unsupervised network-predicted landmarks and human annotated landmarks is analyzed using two metrics:
    a. Euclidean error between predicted landmarks and the 'closest' landmark in the marked region:

Landmarks_Error =
$$\sum_{Iris,Sclera} \min_{i,j}(\|(x_{predicted,i}, y_{predicted,i}) - (x_{marked,j}, y_{marked,j})\|)$$

b. Segmentation region difference between predicted landmarks region and the region defined by the human marked landmarks using the Dice coefficient:

$$Dice = \frac{2|Predicted\_Area \cap Marked\_Area|}{Predicted\_Area + Marked\_Area}$$

As illustrated in FIGS. 9C and 9D, the agreement between the labeling methods is quite substantial, illustrating the value of the unsupervised labeling method disclosed herein.

In the method provided, recovering the given user's eye landmarks can comprise: training at least one autoencoder based on a set of a plurality of the unlabeled images; using at least one of the imaging module, the face detection module, and the eye region cropping module, identifying an image of the eye for the autoencoder; and for each of the eye images, extracting a landmark value corresponding to the eye, with the proviso that regardless of the captured image, the iris radius is constant. The autoencoder can be any type or form of machine learning model that may produce the predetermined number of landmarks from the captured image data via unsupervised deep learning techniques. In the context of the current disclosure, the term "autoencoder" may refer to a neural network with a stacked hourglass architecture (see e.g., FIG. 4). Training module 20 may use one or more additional machine learning techniques, such as backpropagation, to train the autoencoder to produce values in the output layer of the autoencoder that match the values provided in the input layer of the autoencoder. As a result of the training, any layer of the autoencoder may develop features (e.g., based on geometrically and anatomically constrained regularization of landmark disposed equidistance from a central reference point $X_0$, with the proviso that the diameter imposed on central reference point $X_0$ is a constant for all images of the same user, used in another exemplary implementation, as a stationarity property for mean and/or max pooling), that are highly representative of the images in the training set (and, therefore, potentially representative of images not within the training set—the test set) (see e.g., FIG. 2).

An exemplary implementation of a pseudocode for Unsupervised Eye Landmarks Training can be:

configured to provide a large effective receptive field and allows for the encoding of spatial relations between landmarks, even under occlusion.

Figure 5:
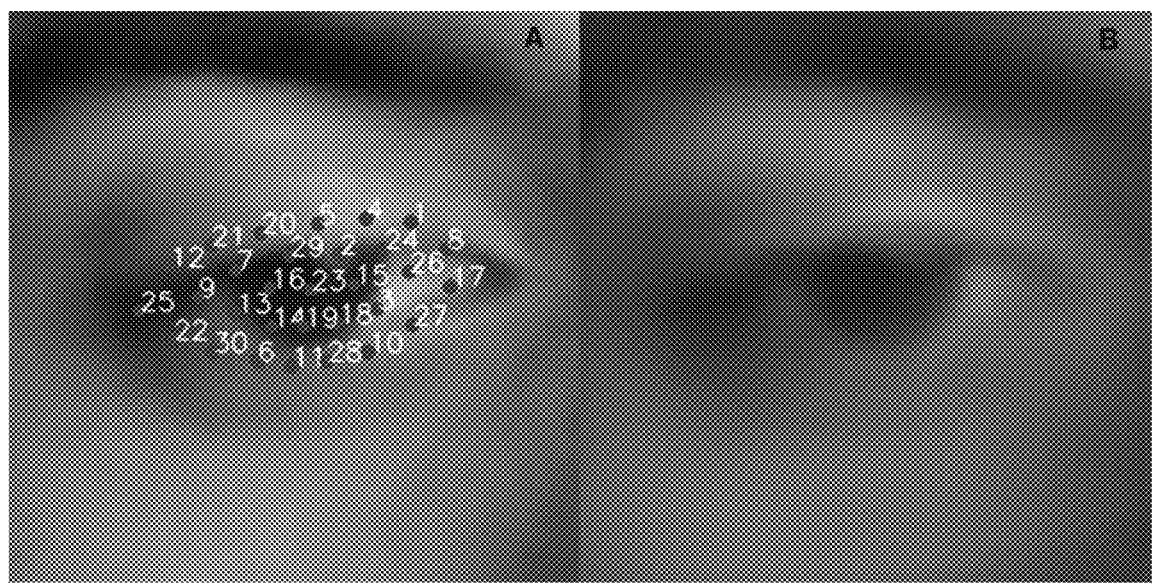
FIG. 5-8, illustrates extracted Iris and Sclera landmarks using initially geometrically constrained convolutional autoencoders (A) and the reconstructed image (B)
Figure 6:
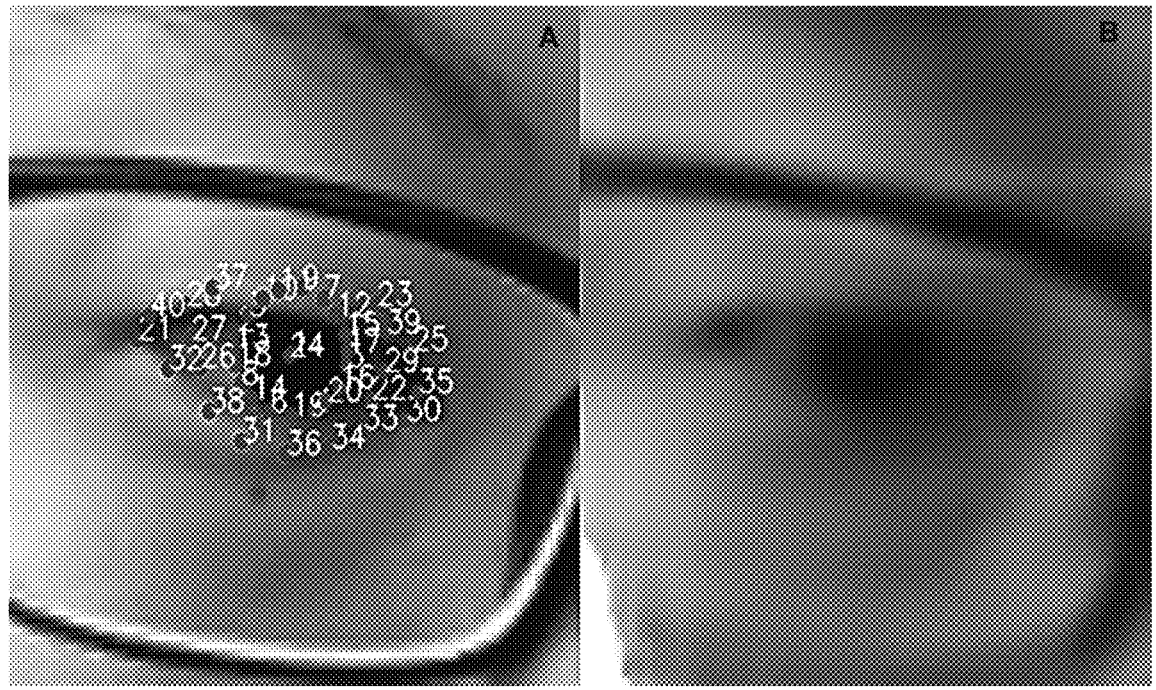
Figure 7:
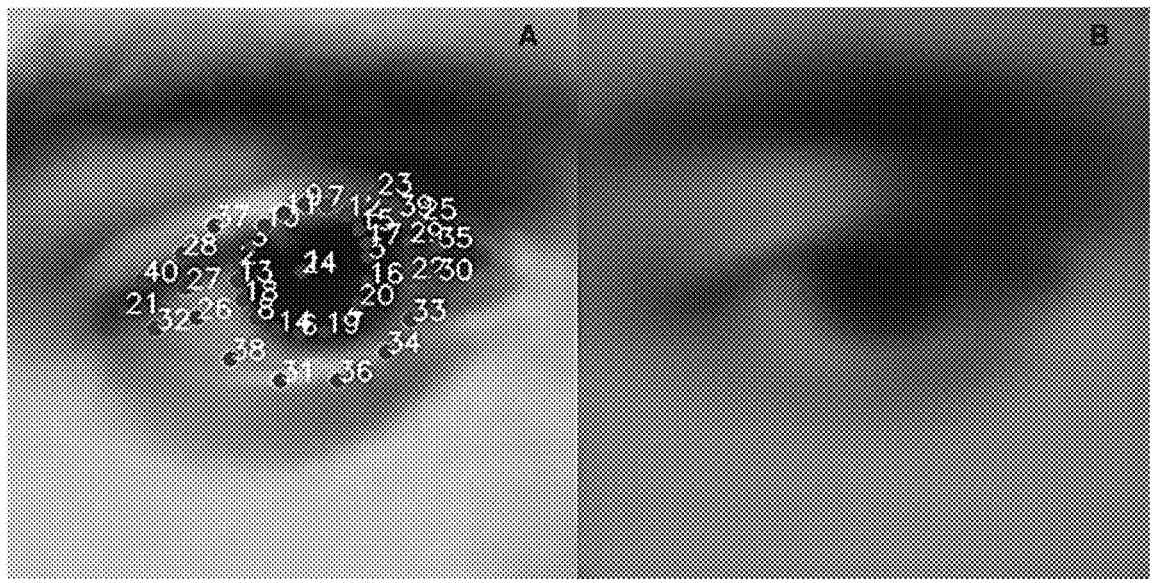

For example, using the eye cropping module, the algorithm used for eye region localization can comprise assigning a vector to every pixel in the edge map of the eye area (see e.g., 25 FIG. 5A), which points to the closest edge pixel. The length and the slope information of these vectors can consequently be used to detect and localize the eyes by matching them with a training set. Additionally, or alternatively, a multistage approach is used in another implementation to detect facial features (among them are the eye centers, or pupils 24, FIG. 6A) using a face detector module, with pairwise reinforcement of feature responses, and a final refinement by using an active appearance model (AAM). Other methods of eye region localization can be employed, for example: using edge projection (GPF) and support vector 1. For Each image in M_ID_CLEAN
    a. For each set of images in ID (size of batch):
    b. For number of EP(= 250) epochs:
        i. For each group of ID's:
            1. For each left and right image train convolutional autoencoder:
                a. Obtain K channels (for each group of landmarks) of detection probability map using CNN encoder module (e.g. Hourglass).
                b. For each channel calculate the geometrical constrain penalty using Iris(index-i) and Sclera (index-j): using the expression $L_{geo}$ by calculating the geometrical landmarks constraints from:
                    i. Ellipse fitting for Iris landmarks using
                    ii. Polynomial fitting for Sclera landmarks.
            c. Perform 'encoding' stage:
                i. Obtain encoder vector (64 values) from the last encoder layer (EncoderVector).
            d. Perform 'decoding' stage:
                i. Using decoder module to reconstruct the image from EncoderVector.
                ii. Calculation of the $L_{AE}$ loss.
            e. Calculation of total loss function for each $L_{AEG}$
2. Update network weights using backpropagation using the total loss.

The "stacked hourglass" architecture of the autoencoders, refers to the visualization of the initial sampling followed by the steps of pooling and subsequent convolution (or up-sampling) used to get the final output of the extracted eye landmarks. Thus, the architecture is configured to produce pixel-wise confidence (in other words, heat maps), whereby the hourglass network, from an initial image at various resolution level pools down to a very low resolution (e.g., using human average iris size as a stationarity property constrained to 11.7 mm±1.4 mm, see e.g., Caroline and Andre', Contact Lens Spectrum, vol. 17, no. 4, 2002, pp. 56), then reconvolute and combines extracted features across multiple resolutions to provide a shared individualized, user-specific feature map.

Figure 3:
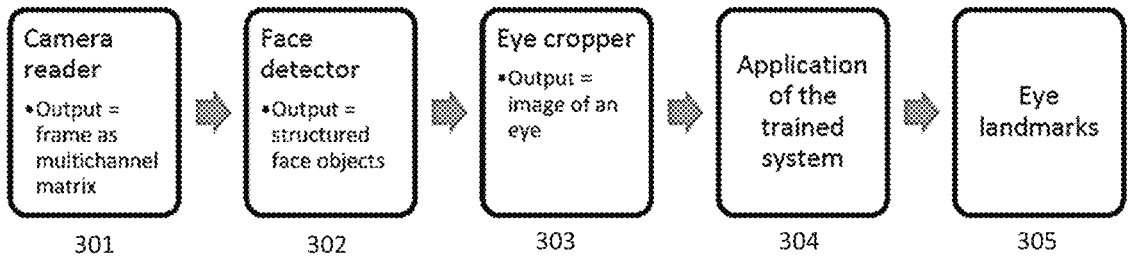
FIG. 3, is a flowchart illustrating the image preprocessing prior to the extraction of eye landmarks.
Figure 4:
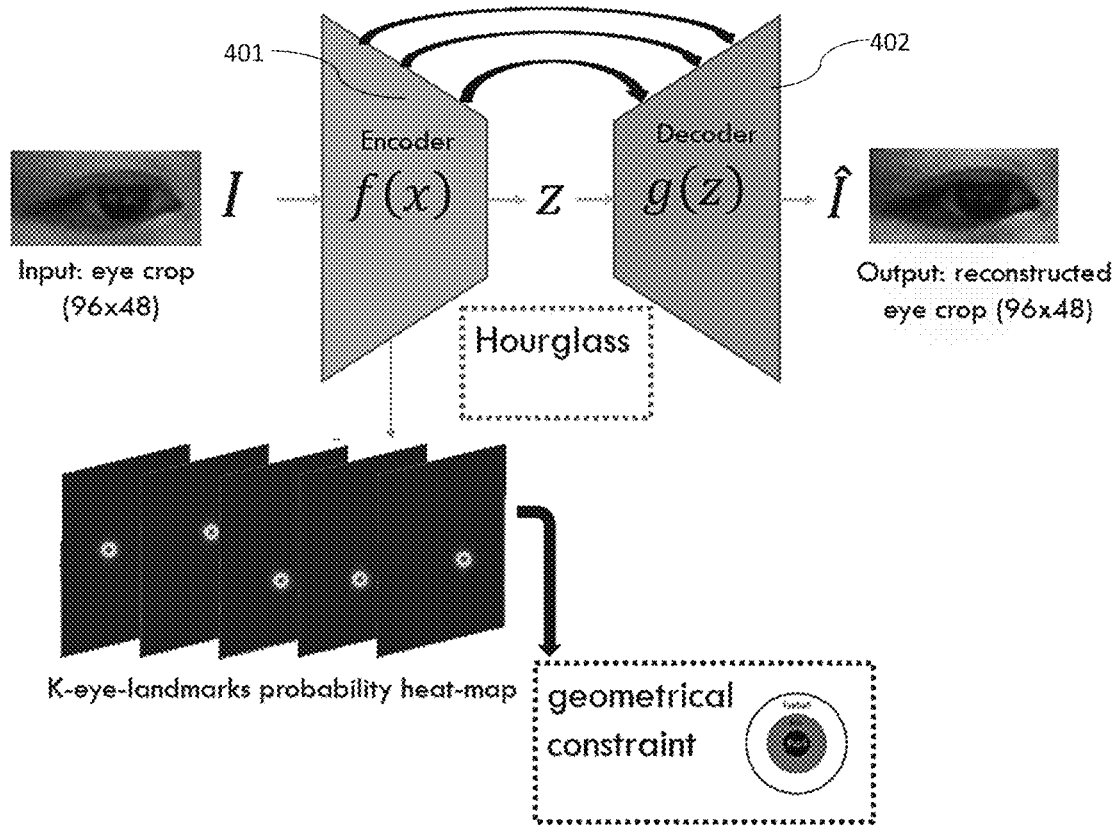
FIG. 4, is a schematic illustrating a schematic of the general training flow.

As illustrated in FIGS. 3, and 4, using imaging module 301, face detection module 302 and eye cropping module 302, from a plurality of images entering the base encoder 401, the images taken at various resolutions (or distances) are assigned an identifier (ID). The feature maps (see e.g., FIG. 4) are downscaled in an exemplary implementation via pooling operations, then upscaled using, for example bilinear interpolation. At every scale level, a residual is calculated and applied via a skip connection from the corresponding layer 401 on the other side of the hourglass 402. Thus, when given, for example, 36 features' maps, the autoencoders' network refines them at 3 different image scales, multiple times. This repeated bottom-up, top-down inference is machines (SVMs) to classify estimates of eye centers using an enhanced version of Reisfeld's generalized symmetry transform for the task of eye location, using Gabor filters, use feature triplets to generate face hypothesis, register them for affine transformations, and verify the remaining configurations using two SVM classifiers, and using an eye detector to validate the presence of a face and to initialize an eye locator, which, in turn, refines the position of the eye using the SVM on optimally selected Haar wavelet coefficients. These methods can be used either alone or in combination within the face detection module.

Figure 8:
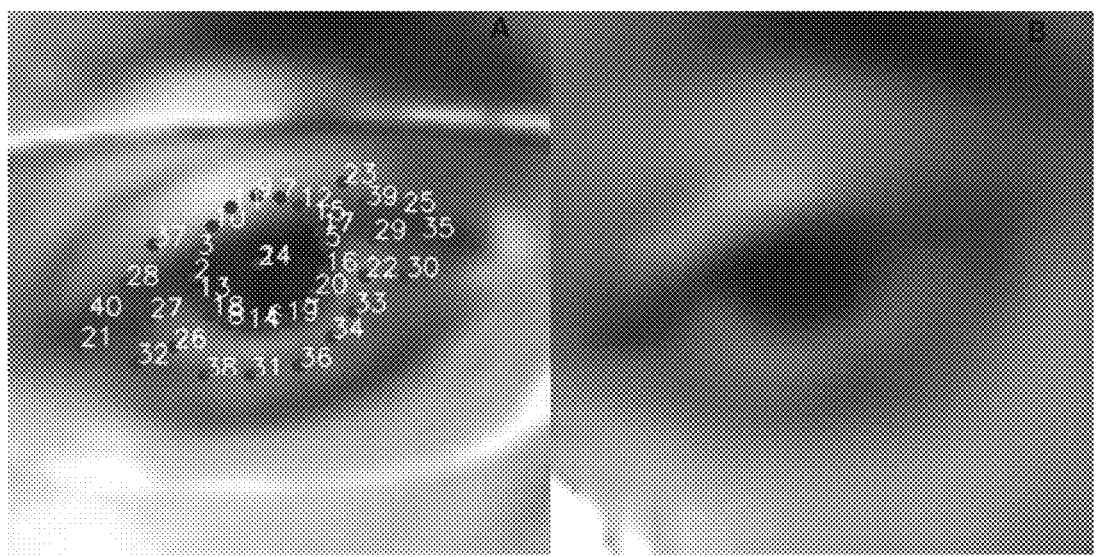

The face detection module can be used further to compute head pose, using for example a detector array method (DAM), in which a series of head detectors are trained, each configured to classify a specific pose and assign a discrete pose to the detector with the greatest support, a technique using machine learning and neural networks. This method can be supplanted or replaced by Nonlinear Regression Methods (NRM), which estimates head pose by learning a nonlinear functional mapping from the image space parsed to individual frame as a multichannel matrix; to one or more pose directions, normally using regression tools and neural networks. Additional methods can be, for example: a flexible algorithm, in which a non-rigid model is fit to the facial structure of the user in the image and wherein head pose is estimated from feature-level comparisons or from the instantiation of the parameters, using the location of extracted features such as the eyes, mouth, and nose (see e.g., FIG. 10)

to determine pose from their relative configuration, recovering the global pose change of the head from the observed movement between video frames then using weighted least squares on particle filtering to discern the head pose. In an exemplary implementation, the head pose determination, can be a hybrid method, combining one or more of the aforementioned methods to overcome the limitations inherent in any single approach. For example, using local feature configuration (eyes, nose tip, lips e.g.,) and sum of square differences (SSD) tracking, or principal component analysis comparison and continuous density hidden Markov Modeling (HMM). The existing models are additionally extended in an exemplary implementation to include the eye landmarks, both visible (e.g. Pupil-center, symmetrically distributed edges) as well as non-visible (e.g. eyeball center) See e.g., FIG. 8 for a user with glasses—A: Original image with unsupervised landmarks (Iris Landmarks and Sclera Landmarks) detection. B: reconstructed image. It should be noted as the shape of the eye is preserved, due to the geometrical constraint of a constant iris size for all images, while the textural appearance of the glasses was redundant and automatically removed (see also, FIG.s In an exemplary implementation, a model-based algorithm is used whereby the recovered landmarks are applied to provide remote gaze estimation. For example, 3D model-based gaze estimation method can be based on the modeling of the eyeball generally as two intersecting spheres (the eyeball—a larger sphere, intersecting with a smaller sphere whereby the non-contained spheroid portion represents the corneal bulge), with deformations, wherein the center and radius of the eyeball as well as the angular offset between visual and optical axes are determined during user calibration procedures and will typically be dependent on head pose. The eyeball center can be determined relative to a facial landmark (See e.g., FIG. 10), or by fitting deformable eye region models. In contrast, 2D model-based methods can observe the deformation of the circular iris due to perspective. In the systems, methods and programs provided herein, a neural network is used to fit an iris to an eye image, it should be noted that the methodology is constrained by the physiological fact that the iris outer larger circle-circumference does not change in size (the limbus region) per individual (thus, the dataset will be segmented per user ID at the training stage).

Since there is no guarantee, that the retrieved landmarks are not arbitrary latent features, a loss function $L_{AE}$ (subscript denotes AutoEncoder) is utilized. The loss function $L_{AE}$ is configured to provide the degree of separation between the distribution of the similarities among the subspaces which belong to the same category, and the distribution of the similarity among the subspaces which belong to the different categories, and if the separation is insufficient, the loss is increased correspondingly. In an exemplary implementation, the loss function is further constrained by the following regularizers: reconstruction loss ($L_{recon}$); concentration loss ($L_{conc}$); separation loss ($L_{sep}$); and equivalence loss ($L_{eqv}$), represented by the equation (Equ.1):

$$L_{AE} = \lambda_{recon}L_{recon} + \lambda_{conc}L_{conc} + \lambda_{sep}L_{sep} + \lambda_{eqv}L_{eqv}$$

Where $L_{recon}$—refers to the reconstruction constraint, defined as: $L_{recon} = \|I - \tilde{I}\|_F^2$, (Equ.2) where I is normalized to [0,1];

$L_{conc}$—refers to the concentration constraint, $L_{conc} = 2\pi e (\sigma_{det,u}^2 + \sigma_{det,v}^2)^2$ in other words, ensuring the landmarks are concentrated in the same (eye) region and defined as: (Equ.3) where $\sigma_{det,u}^2$ and $\sigma_{det,v}^2$ are the variances along two axis, and are user specific (in other words, do not change in physical size across images from different sensors from different capturing angles);

$L_{sep}$—refers to the separation constraint. The separation constraint is introduced to regularize, in other words, to prevent overfitting and solve for the possibility that the mean coordinates of the initial landmarks, weighted by D, may be concentrated all around the image center in the beginning of the training. This can lead to the inability of gradient descent to escape the local optima. Accordingly, an $$L_{sep} = \sum_{k \neq k'}^{1,\ldots,K} \exp\exp\left(\frac{\|(x_{k'}, y_{k'}) - (x_k, y_k)\|_2^2}{2\sigma_{sep}^2}\right), \quad (4)$$

explicit loss is introduced to spatially separate the landmarks (see e.g., FIG. 9, A, C, E, G). Accordingly, (Equ.4) where $\sigma_{sep}^2$ is a hyperparameter, which control the width of the Gaussian, located about each landmark. Such formulation penalizes the close adjacency of the landmarks.

$L_{eqv}$—refers to the equivariance constraint, used to ensure that landmarks to show equivariance to image transformations. More specifically, a landmark should move according to the (affine) transformation (e.g., camera and object motion, e.g., translation, rotation, shear), applied to the image if the corresponding visual semantics still exist in the transformed image. Let $g(\cdot,\cdot)$ be a coordinate transformation that map image (or landmarks) I to I' (u, v)=l(g(u, v)), and l (the recovered landmark)=[x'1, y'1, . . . , x'K, y'K]$^T$= landmark(I'). Leading ideally to g(x'k, y'k)=(xk, yk), all which yields the constraint (or regularizing expression) (Equ. 5)

$$L_{eqv} = \sum_{k=1}^{K} \|g(x'_k, y'_k) - (x_k, y_k)\|_2^2 \quad (5)$$

Figure 2A:
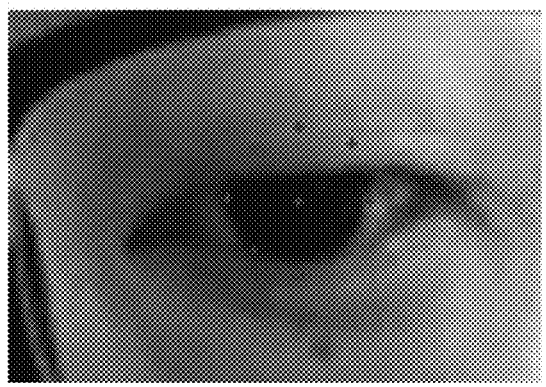
FIG. 2A-2D, illustrates the extracted Iris landmarks in the unlabeled image (A, C) and the reconstructed image (B, D)
Figure 2B:
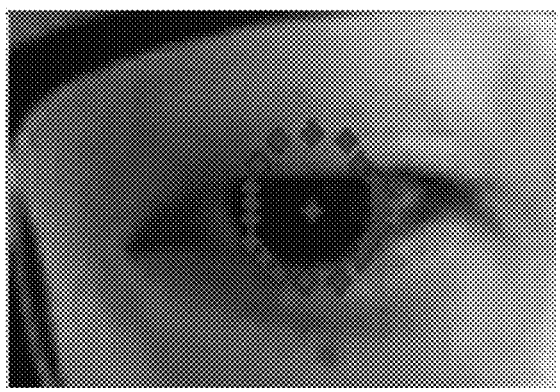
Figure 2C:
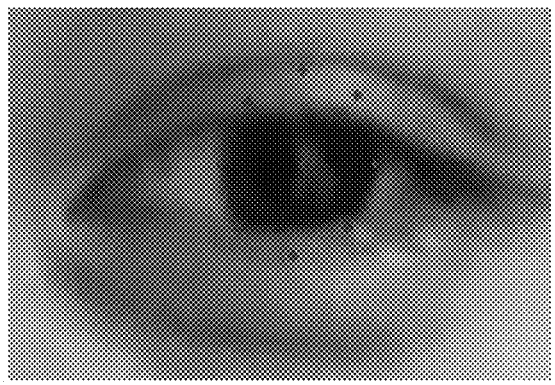
Figure 2D:
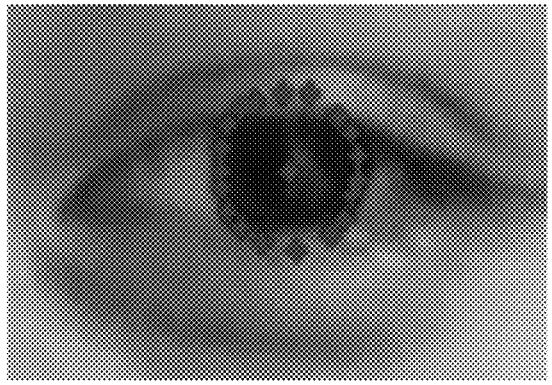

The total loss function is further constrained with an initial geometric regularizer. When added to the above-identified soft constraint regularizes, the A-weighted geometric loss assures that the recovered landmarks are located at approximately equivalent distance from landmark zero $[x_0, y_0]$. The Iris center is chosen to serve as landmark zero. FIG. 2 shows the result of training where FIGS. 2A, 2C shows the retrieved landmarks, trained on synthetic data using Equ. 1, while FIG. 2B, 2D show the results when minimizing the total loss function $L_{AEG}$, represented by the equation (Equ. 6):

$$L_{AEG} = \lambda_{geo}L_{geo} + \lambda_{recon}L_{recon} + \lambda_{conc}L_{conc} + \lambda_{sep}L_{sep} + \lambda_{eqv}L_{eqv}$$

where $\lambda_{geo}$ is the weighting of the geometric loss, configured to ensure that the recovered landmarks are located at about the same distance from a landmark zero, and the geometric loss $L_{geo}$, is represented by the equation (Equ. 7):

$$L_{geo} = \sum_{ij}(\|(x_0, y_0) - (x_i, y_i)\| - \|(x_0, y_0) - (x_j, y_j)\|)^2$$

Once the system is trained sufficiently, subsequent images in, for example, validation dataset images can be processed using subsequent geometric regularizer represented by the equation $$\mathcal{L}_{geometric} = \sum_{i}(\|(\tilde{x}_i, \tilde{y}_i) - (x_i, y_i)\|^2$$

Forming the eye image, which is fed into the foundation autoencoder stack in the hourglass neural network architecture used in the systems, methods and programs provided herein can comprise, for example: using the imaging module, producing a multichannel matrix frame (for example, in a three-channel two-dimensional matrix representing red, green, blue (RGB) bytes, the matrix data is stored: rgbrgbrgb . . . ), a digitized image where of the captured unlabeled image comprising the eye region; using a face detector module in communication with the central processing module, forming a structured face object from the multichannel matrix frame; and using an eye cropper module in communication with the central processing module, forming an image of at least one eye from the structured face object.

It is noted that the term "imaging module" as used herein means a unit that includes a plurality of built-in image and/or optic sensors and outputs electrical signals, which have been obtained through photoelectric conversion, as an image, while the term "module" refers to software, hardware, for example, a processor, or a combination thereof that is programmed with instructions for carrying an algorithm or method. The modules described herein may communicate through a wired connection, for example, a hard-wired connection, a local area network, or the modules may communicate wirelessly. The imaging module may comprise charge coupled devices (CCDs), a complimentary metal-oxide semiconductor (CMOS) or a combination comprising one or more of the foregoing. If static images are required, the imaging module can comprise a digital frame camera, where the field of view (FOV) can be predetermined by, for example, the camera size and the distance from the subject's face. The cameras used in the imaging modules of the systems and methods disclosed, can be a digital camera. The term "digital camera" refers in an exemplary implementation to a digital still camera, a digital video recorder that can capture a still image of an object and the like. The digital camera can comprise an image capturing unit or module, a capture controlling module, a processing unit (which can be the same or separate from the central processing module).

Capturing the image can be done with, for example image capturing means such as a CCD solid image capturing device of the full-frame transfer type, and/or a CMOS-type solid image capturing device, or their combination.

The systems used herein can be computerized systems further comprising a central processing module; a display module; and a user interface module. The Display modules, which can include display elements, which may include any type of element which acts as a display. A typical example is a Liquid Crystal Display (LCD). LCD for example, includes a transparent electrode plate arranged on each side of a liquid crystal. There are however, many other forms of displays, for example OLED displays and Bi-stable displays. New display technologies are also being developed constantly. Therefore, the term display should be interpreted widely and should not be associated with a single display technology. Also, the display module may be mounted on a printed circuit board (PCB) of an electronic device, arranged within a protective housing and the display module is protected from damage by a glass or plastic plate arranged over the display element and attached to the housing.

Additionally, "user interface module" broadly refers to any visual, graphical, tactile, audible, sensory, or other means of providing information to and/or receiving information from a user or other entity. For example, a set of instructions which enable presenting a graphical user interface (GUI) on a display module to a user for displaying and changing and or inputting data associated with a data object in data fields. In an exemplary implementation, the user interface module is capable of displaying any data that it reads from the imaging module.

As indicated, the systems implementing the methods provided, using the programs provided can further comprise a central processing module; a display module; and a user interface module. The term 'module', as used herein, means, but is not limited to, a software or hardware component, such as a Field Programmable Gate-Array (FPGA) or Application-Specific Integrated Circuit (ASIC), which performs certain tasks. A module may advantageously be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Unless specifically stated otherwise, as apparent from the discussions, it is appreciated that throughout the specification discussions utilizing terms such as "processing," "loading," "in communication," "detecting," "calculating," "determining", "analyzing," or the like, refer to the action and/or processes of a computer or computing system, or similar electronic computing device, that manipulate and/or transform data represented as physical, such as the Iris size into other data similarly represented as physical layers, such as the transformed data.

As indicated, provided herein is a computer program, comprising program code means for carrying out the steps of the methods described herein, as well as a computer program product (e.g., a micro-controller) comprising program code means stored on a medium that can be read by a computer, such as a hard disk, CD-ROM, DVD, USB memory stick, or a storage medium that can be accessed via a data network, such as the Internet or Intranet, when the computer program product is loaded in the main memory of a computer [or micro-controller] and is carried out by the computer [or micro controller].

Furthermore, provided herein is a computer-readable medium comprising the executable instructions disclosed. Accordingly, provided herein is a processor readable media comprising a set of executable instructions which, when executed, cause the at least one processor being in communication with an imaging module, a central processing module, a database, a face detector module, and an eye cropper module to: capture an unlabeled image comprising the eye region; and using am initially geometrically regularized loss function, train a plurality of convolutional autoencoders on the unlabeled image comprising the eye region to recover a plurality of eye landmarks. Furthermore, for recovering eye landmarks, the set of executable instructions further causes the at least one processor, when executed to: train at least one autoencoder based on a set of a plurality of the unlabeled image; identify an image of the eye for the autoencoder; and for each of the eye images, extract a landmark value corresponding to the eye.

The term "computer-readable medium" as used herein, in addition to having its ordinary meaning, refers to any medium that participates in providing instructions to a processor for execution. Such a medium may take many forms, including but not limited to, non-volatile media and volatile media. Non-volatile media can be, for example, optical or magnetic disks, such as a storage device. Volatile media includes dynamic memory, such as main memory.

Memory device as used in the methods, programs and systems described herein can be any of various types of memory devices or storage devices. The term "memory device" is intended to encompass an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, optical storage, or ROM, EPROM, FLASH, etc. The memory device may comprise other types of memory as well, or combinations thereof. In addition, the memory medium may be located in a first computer in which the programs are executed (e.g., a training computer), and/or may be located in a second different computer [or micro controller] which connects to the first computer over a network, such as the Internet [remark: they might be even not connected and information will be transferred using USB stick]. In the latter instance, the second computer may further provide program instructions to the first computer for execution. The term "memory device" can also include two or more memory devices which may reside in different locations, e.g., in different computers that are connected over a network.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the stack(s) includes one or more stack). Reference throughout the specification to "one embodiment", "another embodiment", "an exemplary implementation", and so forth, when present, means that a particular element (e.g., feature, structure, and/or characteristic) described in connection with the embodiments, examples and implementations; is included in at least one exemplary implementation described herein, and may or may not be present in other exemplary implementations. In addition, it is to be understood that the described elements may be combined in any suitable manner in the various implementations and examples disclosed.

Accordingly, provided herein is a method for unsupervised, deep learning of eye-landmarks in a user-specific eyes' image data, implementable in a computerized system comprising: in imaging module, a user interface; an image database, a face detector module, an eye cropper module, and a central processing module in communication with the imaging module, the user interface, and the imaging database, the method comprising: capturing an unlabeled image comprising the eye region of the user; and using an initial geometrically regularized loss function, training a plurality of convolutional autoencoders on the unlabeled image comprising the eye region of the user to recover a plurality of user-specific eye landmarks, wherein (i) recovering eye landmarks comprises: training at least one autoencoder based on a set of a plurality of the unlabeled image; identifying an image of the eye for the autoencoder; and for each of the eye images, extracting a landmark value corresponding to the eye of the user, wherein the landmark extracted is constrained to at least one user-specific parameter, the method further comprising (ii) comprising using model-based algorithm, applying the recovered landmarks to provide remote gaze estimation, (iii) the loss function is further constrained by: reconstruction loss (Lrecon); concentration loss (Lconc); separation loss (Lsep); and equivalence loss (Leqv), (iv) the initial geometric regularization is represented by the equation:

$$L_{geo} = \sum_{ij}^{K}(\|(x_0, y_0) - A(f)(x_i, y_i)\| - \|(x_0, y_0) - (x_j, y_j)\|)^2$$

Where A(f) is an affine transform of the image-dependent landmarks, (v) the loss function is represented by the formula: $L_{AE} = \lambda_{recon}L_{recon} + \lambda_{conc}L_{conc} + \lambda_{sep}L_{sep} + \lambda_{eqv}L_{eqv}$, wherein (vi) training the convolutional neural network for autoencoded landmarks'-based recovery from the unlabeled image comprises minimizing the loss function, wherein (vii) the plurality of convolutional autoencoders is comprised of a stacked hourglass network architecture, (viii) the geometric regularizer is weighted to assure that the recovered landmarks are located at about the same distance from a landmark zero, (ix) which is the iris center, wherein (x) the step of forming an unlabeled eye image comprises: using the imaging module, producing a multichannel matrix frame of the captured unlabeled image comprising the eye region; using a face detector module in communication with the central processing module, forming a structured face object from the multichannel matrix frame; and using an eye cropper module in communication with the central processing module, forming an image of at least one eye from the structured face object, further comprising (xi) capturing a plurality of subsequent unlabeled images comprising the eye region, and using a subsequent geometrically regularized loss function, training the plurality of convolutional autoencoders on the subsequent unlabeled images, (xii) the subsequent geometric regularization is represented by the equation:

$$\mathcal{L}_{geometric} = \sum_{i}(\|(\tilde{x}_i, \tilde{y}_i) - (x_i, y_i)\|^2,$$

wherein the method disclosed (xiii) is, used in the process of calibrating a smartphone for performing gaze estimation onto at least one of the smartphone screen, a flat remote surface, and a user-facing camera.

In another exemplary implementation, provided herein is a processor readable media, comprising a set of executable instructions which, when executed cause the at least one processor being in communication with an imaging module, a central processing module, a database, a face detector module, and an eye cropper module to: capture an unlabeled image comprising the eye region; and using an initially geometrically regularized loss function, train a plurality of convolutional autoencoders on the unlabeled image comprising the eye region to recover a plurality of eye landmarks, wherein (xiv) for recovering eye landmarks, the set of executable instructions further causes the at least one processor, when executed to: train at least one autoencoder based on a set of a plurality of the unlabeled image; identify an image of the eye for the autoencoder; and for each of the eye images, extract a landmark value corresponding to the eye, wherein (xv) the initial geometrical regularization is represented by the formula:

$$\mathcal{L}_{geometric} = \sum_{ij}(\|(x_0, y_0) - (x_i, , y_i)\| - \|(x_0, y_o) - (x_j, y_j)\|)^2.$$

wherein (xvi) wherein the loss function is represented by the formula: $L_{AE}=\lambda_{recon}L_{recon}+\lambda_{conc}L_{conc}+\lambda_{sep}L_{sep}+\lambda_{eqv}L_{eqv}$ wherein: $L_{recon}$ is reconstruction loss; $L_{conc}$—is concentration loss; $L_{sep}$—is separation loss; and $L_{eqv}$—is equivalence loss, wherein (xvii) the set of executable instructions, when executed further causes the at least one processor to: using the imaging module, capture a plurality of subsequent unlabeled images comprising the eye region, and using a subsequent geometrically regularized loss function, train the plurality of convolutional autoencoders on the subsequent unlabeled images, and wherein (xviii) the subsequent geometric regularization is represented by the equation:

$$\mathcal{L}_{geometric} = \sum_{i}(\|(\tilde{x}_i, \tilde{y}_i) - (x_i, y_i)\|^2.$$

Although the foregoing disclosure for systems, methods and programs for geometrically constrained, unsupervised training of convolutional autoencoders on unlabeled images for extracting eye landmarks has been described in terms of some implementations, other implementations will be apparent to those of ordinary skill in the art from the disclosure herein. Moreover, the described implementations have been presented by way of example only, and are not intended to limit the scope of the particular implementation. Indeed, the novel methods, programs, and systems described herein may be embodied in a variety of other forms without departing from the spirit thereof. Accordingly, other combinations, omissions, substitutions and modifications will be apparent to the skilled artisan in view of the disclosure herein.

While the invention has been described in detail and with reference to specific exemplary implementations thereof, it will be apparent to one of ordinary skill in the art that various changes and modifications can be made therein without departing from the spirit and scope thereof. Accordingly, it is intended that the present disclosure covers the modifications and variations of this invention provided they come within the scope of the appended claims and their equivalents.

What is claimed:

1. A method for unsupervised, deep learning of eye-landmarks in a user-specific eyes' image data, implementable in a computerized system, the method comprising:
   a. capturing an unlabeled' image comprising an eye region of a user;
   b. using an initial geometrically regularized loss function, training a plurality of convolutional autoencoders on the unlabeled image comprising the eye region of the user to recover a plurality of user-specific eye landmarks;
   c. training the convolutional neural network for autoencoded landmarks-based recovery from the unlabeled image; and
   d. wherein the initial geometrically regularized loss function is represented by the formula $$L_{AE}=\lambda_{recon}L_{recon}+\lambda_{conc}L_{conc}+\lambda_{sep}L_{sep}+\lambda_{eqv}L_{eqv}$$

wherein
$L_{AE}$ is total AutoEncoder Loss,
$\lambda_{recon}L_{recon}$ is k-weighted reconstruction loss,
$\lambda_{conc}L_{conce}$ is k-weighted concentration loss,
$\lambda_{sep}L_{sep}$ is k-weighted separation loss, and
$\lambda_{eqv}L_{eqv}$ is k-weighted equivalence loss.

2. The method of claim 1, wherein the training the convolutional neural network for autoencoded landmarks'-based recovery from the unlabeled image comprises minimizing the initial geometrically regularized loss function.

3. The method of claim 2, wherein the plurality of convolutional autoencoders comprises a stacked hourglass network architecture and a geometric regularizer that is weighted to assure that recovered user-specific eye landmarks are located at about the same distance from a landmark zero.

4. The method of claim 3, wherein the landmark zero is a center of an iris of the user.

5. The method of claim 1, wherein the recovering a plurality of user-specific eye landmarks comprises: a. training at least one autoencoder based on the unlabeled image, b. identifying an image of the eye for the autoencoder, and c. for each of the identified eye images, extracting one or more landmark coordinates corresponding to the eye of the user, wherein the one or more extracted landmark coordinates is constrained to at least one user-specific parameter.

6. The method of claim 5, further comprising using at least one model-based algorithm, applying the one or more extracted landmark coordinates constrained to at least one user-specific parameter to provide remote gaze estimation.

7. A method for unsupervised, deep learning of eye-landmarks in a user-specific eyes' image data, implementable in a computerized system, the method comprising:
   a. capturing an unlabeled' image comprising an eye region of a user;
   b. using an initial geometrically regularized loss function, training a plurality of convolutional autoencoders on the unlabeled image comprising the eye region of the user to recover a plurality of user-specific eye landmarks;
   c. training the convolutional neural network for autoencoded landmarks-based recovery from the unlabeled image; and
   d. wherein the initial geometrically regularized loss function is represented by the equation $$L_{geo} = \sum_{ij}^{K}(\|(x_0, y_0) - A(f)(x_i, y_i)\| - \|(x_0, y_0) - (x_j, y_j)\|)^2$$

wherein $L_{geo}$ is geometric loss,
$(x_0, y_0)$ are center coordinates of the iris,
$A(f)$ is an affine transform of image-dependent landmarks,
$(x_i, y_i)$ are coordinates of an $i^{th}$ recovered landmark, and
$(x_j, y_j)$ are coordinates of a $j^{th}$ recovered landmark.

8. The method of claim 1, wherein the capturing an unlabeled image comprising the eye region of a user further comprises:
   e. producing a multichannel matrix frame of the captured unlabeled image comprising the eye region of a user;
   f. forming a structured face object from the multichannel matrix frame; and
   g. forming an image of at least one eye from the structured face object.

9. The method of claim 1, further comprising capturing a plurality of subsequent unlabeled images comprising the eye region, and using a subsequent geometrically regularized loss function, training the plurality of convolutional autoencoders on the plurality of subsequent unlabeled images.

10. The method of claim 9, wherein a subsequent geometric regularization is represented by the equation $$\mathcal{L}_{geometric} = \sum_i (\|(\tilde{x}_i, \tilde{y}_i) - (x_i, y_i)\|)^2$$

wherein $L_{geometric}$ is the subsequent geometrically regularized loss function,
$\tilde{x}_i, \tilde{y}_i$ are transformed landmark coordinates, and
$x_i, y_i$ are recovered landmark coordinates.

11. The method of claim 1, used in the process of calibrating a smartphone for performing gaze estimation onto at least one of a smartphone screen, a flat remote surface, or a user-facing camera.

12. A non-transitory processor readable media comprising a set of executable instructions which, when executed cause the at least one processor to:
   a. capture an unlabeled image comprising an eye region of a user,
   b. using an initial geometrically regularized loss function, training a plurality of convolutional autoencoders on the unlabeled image comprising the eye region of the user to recover a plurality of user-specific eye landmarks,
   c. training the convolutional neural network for autoencoded landmarks-based recovery from the unlabeled image, and
   d. wherein for recovering the plurality of eye landmarks, the set of executable instructions further causes the at least one processor, when executed to
      e. train at least one autoencoder from the plurality of convolutional autoencoders based on a plurality of captured unlabeled images comprising the eye region of a user,
      f. identify an image of the eye for the at least one autoencoder,
      g. for each of the identified eye images, extract one or more landmark coordinates corresponding to the eye, and
   h. wherein the initial geometrically regularized loss function is represented by the formula $$\mathcal{L}_{geometric} = \sum_{ij} (\|(x_0, y_0) - (x_i, y_i)\| - \|(x_0, y_0) - (x_j, y_j)\|)^2$$

wherein $L_{geometric}$ is geometric loss,
$(x_0, y_0)$ are center coordinates of an iris of the eye,
A(f) is an affine transform of image-dependent landmarks,
$(x_i, y_i)$ are coordinates of an $i^{th}$ recovered landmark, and
$(x_j, y_j)$ are coordinates of a $j^{th}$ recovered landmark.

13. The non-transitory processor readable media of claim 12, wherein for recovering the plurality of eye landmarks, the set of executable instructions further causes the at least one processor, when executed to
   i. train at least one autoencoder from the plurality of convolutional autoencoders based on a plurality of captured unlabeled images comprising the eye region of a user,
   j. identify an image of the eye for the at least one autoencoder, and
   k. for each of the identified eye images, extract one or more landmark coordinates corresponding to the eye.

14. A non-transitory processor readable media comprising a set of executable instructions which, when executed cause the at least one processor to:
   a. capture an unlabeled image comprising an eye region of a user,
   b. using an initial geometrically regularized loss function, train a plurality of convolutional autoencoders on the unlabeled image comprising the eye region of the user to recover a plurality of user-specific eye landmarks,
   c. train the convolutional neural network for autoencoded landmarks-based recovery from the unlabeled image, and
   d. wherein for recovering the plurality of eye landmarks, the set of executable instructions further causes the at least one processor, when executed to
      e. train at least one autoencoder from the plurality of convolutional autoencoders based on a plurality of captured unlabeled images comprising the eye region of a user,
      f. identify an image of the eye for the at least one autoencoder,
      g. for each of the identified eye images, extract one or more landmark coordinates corresponding to the eye, and
   h. wherein a loss function is represented by the formula:

$$L_{AE} = \lambda_{recon} L_{recon} + \lambda_{conc} L_{conc} + \lambda_{sep} L_{sep} + \lambda_{eqv} L_{eqv}$$

wherein
$L_{recon}$ is reconstruction loss,
$L_{conc}$ is concentration loss,
$L_{sep}$ is separation loss, and
$L_{eqv}$ is equivalence loss.

15. The non-transitory processor readable media of claim 12, wherein the set of executable instructions, when executed, further causes the at least one processor to:
   i. capture a plurality of subsequent unlabeled images comprising the eye region; and
   j. using a subsequent geometrically regularized loss function, train the plurality of convolutional autoencoders on the plurality of subsequent unlabeled images.

16. The non-transitory processor readable media of claim 12, wherein a subsequent geometric regularization is represented by the equation $$\mathcal{L}_{geometric} = \Sigma_i (\|(\tilde{x}_i, \tilde{y}_i) - (x_i, y_i)\|)^2$$

wherein
$L_{geometric}$ is the subsequent geometrically regularized loss function,
$\tilde{xi}, \tilde{yi}$ are transformed landmark coordinates, and
xi, yi are recovered landmark coordinates.

* * * * *